(12) United States Patent
Hanson

(10) Patent No.: US 12,005,375 B2
(45) Date of Patent: Jun. 11, 2024

(54) HIGH CAPACITY TRAY FOR LIQUID-LIQUID TREATING

(71) Applicant: VALERO SERVICES, INC., San Antonio, TX (US)

(72) Inventor: Daryl Hanson, San Antonio, TX (US)

(73) Assignee: Valero Services Inc., San Antonio, TX (US)

(*) Notice: Subject to any disclaimer, the term of this patent is extended or adjusted under 35 U.S.C. 154(b) by 0 days.

(21) Appl. No.: 17/637,255

(22) PCT Filed: Aug. 12, 2020

(86) PCT No.: PCT/US2020/045971
§ 371 (c)(1),
(2) Date: Feb. 22, 2022

(87) PCT Pub. No.: WO2021/034571
PCT Pub. Date: Feb. 25, 2021

(65) Prior Publication Data
US 2022/0280884 A1 Sep. 8, 2022

Related U.S. Application Data

(60) Provisional application No. 62/890,381, filed on Aug. 22, 2019.

(51) Int. Cl.
B01J 19/32 (2006.01)
B01D 11/04 (2006.01)
C10G 21/00 (2006.01)

(52) U.S. Cl.
CPC .......... B01D 11/043 (2013.01); B01J 19/32 (2013.01); C10G 21/00 (2013.01); B01J 2219/32286 (2013.01)

(58) Field of Classification Search
None
See application file for complete search history.

(56) References Cited

U.S. PATENT DOCUMENTS

| | | |
|---|---|---|
| 1,664,483 A | 4/1928 | Piron |
| 1,965,549 A | 7/1934 | Holmes et al. |
| 2,507,325 A | 5/1950 | Throckmorton et al. |
| 2,647,855 A * | 8/1953 | Grunewald ........ B01D 11/0484 208/334 |
| 2,717,854 A | 9/1955 | Felix |
| 3,809,375 A * | 5/1974 | Bonnet ............. B01D 11/0461 261/87 |
| 3,988,116 A | 10/1976 | Robbins |

(Continued)

OTHER PUBLICATIONS

International Search Report and Written Opinion issued in corresponding PCT Application No. PCT/US2020/045971, dated Dec. 31, 2020.

Primary Examiner — Tam M Nguyen
(74) Attorney, Agent, or Firm — Norton Rose Fulbright US LLP

(57) ABSTRACT

The present disclosure relates to an improved sieve tray assembly for a liquid-liquid treating column. The tray is a modular design with inlet and outlet downcomer assemblies that are mounted flush to or raised above the sieve deck upper surface. The raised downcomer assemblies provide increased surface area for light liquid upflow perforations and enhanced liquid-liquid contacting capacity and efficiency.

12 Claims, 5 Drawing Sheets

(56) References Cited

U.S. PATENT DOCUMENTS

| | | | | |
|---|---|---|---|---|
| 4,247,521 | A | * | 1/1981 | Forte .................... B01D 11/043 422/256 |
| 4,349,360 | A | | 9/1982 | Schuurmans et al. |
| 4,499,035 | A | * | 2/1985 | Kirkpatrick .............. B01D 3/22 261/114.3 |
| 4,732,585 | A | * | 3/1988 | Lerner ................... F28F 13/06 261/153 |
| 5,300,132 | A | | 4/1994 | Konijn |
| 5,702,647 | A | | 12/1997 | Lee et al. |
| 2004/0036186 | A1 | | 2/2004 | Lee et al. |
| 2013/0062256 | A1 | * | 3/2013 | Koseoglu ........... B01D 17/0217 208/89 |
| 2015/0352462 | A1 | * | 12/2015 | Glüer ................. B01F 23/2368 261/114.5 |
| 2016/0061541 | A1 | * | 3/2016 | Chen ....................... F28F 25/08 261/97 |
| 2017/0014730 | A1 | * | 1/2017 | Hammon ................ C07C 51/44 |
| 2022/0299453 | A1 | * | 9/2022 | Hanson ................ G01N 23/095 |

* cited by examiner

HIGH CAPACITY TRAY FOR LIQUID-LIQUID TREATING

CROSS-REFERENCE TO RELATED APPLICATIONS

This application is a national phase application under 35 U.S.C. § 371 of International Application No. PCT/US2020/045971, filed Aug. 12, 2020, which claims the benefit of U.S. Provisional Application No. 62/890,381, filed Aug. 22, 2019, all of which are hereby incorporated by reference in their entirety.

FIELD OF THE INVENTION

This invention relates to liquid-liquid contactor sieve trays for improving mass transfer efficiency in chemical process columns.

BACKGROUND

In petroleum refineries, physical separation processes are used to separate mixtures into constituent components and to remove contaminants. A number of different physical separation processes are performed in liquid-liquid treating columns. The columns are affixed with internal trays or packing material that function to increase column contact and separation efficiency.

Liquid-liquid sieve trays are the simplest of the various types of internal column trays. A conventional liquid-liquid sieve tray assembly includes a sieve deck with a plurality of orifices (active area), an inlet downcomer for providing heavy liquid onto the active area, and outlet downcomer for collecting and draining the heavy liquid to the next tray.

In liquid-liquid separation, a first heavy liquid stream is introduced to the upper part of the treating column and a second light liquid stream is introduced to the lower part of the treating column. Light and heavy refer to the relative densities of the two (or more) liquid streams. One of the streams contains contaminants requiring removal via the physical contact (mass transfer) that occurs in the column. The other stream has the ability to physically remove or chemically react with and remove contaminants from the first stream.

In liquid-liquid treating, a first phase flows continuously through the available column volume and a second phase flows while being dispersed through the first phase. Typically, the heavy liquid is the continuous phase and the light liquid is the dispersed phase. The light liquid stream passes progressively upward through the column from tray assembly to tray assembly by passing through the sieve deck orifices to mix with the downward flowing liquid stream which is aggregated on the sieve deck upper surface. The heavy liquid pools in the inlet downcomer, accumulates and flows across the sieve deck, and accumulates in the outlet downcomer. The heavy liquid passes downward through an opening in the outlet downcomer, often a pipe, to the next tray assembly below. The light liquid contacts the heavy liquid accumulated on the perforated sieve deck upper surface, disperses, and then coalesces before it contacts the tray above and flows through the orifices of the next sieve deck for another round of contacting. The light and heavy liquids intimately mix on the tray surface, which allows the mass transfer contaminant-removal process to occur.

Inlet downcomers provide a reservoir area for column dynamic control as well as preliminary distribution onto the sieve deck to provide a plug flow across the active area. Outlet downcomers provide a coalescing reservoir for light liquid disengagement from the heavy liquid prior to the heavy liquid flowing to the tray below. The light liquid should be virtually free of heavy liquid prior to flowing through the sieve decks to maximize capacity and prevent poor performance.

Current sieve tray varieties are based on long-standing, unitary designs that have remained mostly unchanged since the mid 1900s. The unitary designs include inlet and outlet downcomers that are integral components of the sieve tray assembly. Unitary design sieve tray assemblies are difficult to install, owing in part to numerous seal welds that are required to meet "no leak" tray criteria. Unitary design sieve tray assemblies are also difficult to repair because design specifications recommend against welding to the column shell after the column has left the manufacturing shop.

Accordingly, there is a need in the industry for sieve tray assembly designs that will facilitate sieve tray installation and repair, and provide additional process capacity.

SUMMARY

The present disclosure provides a modular sieve tray assembly with inlet and outlet downcomer assemblies that are not integral parts of the sieve deck. The sieve deck is a planar component that is mounted horizontally within the column. The inlet and outlet downcomer assemblies are distinct, separate components that do not share components or surfaces with the sieve deck. That is, the inlet and outlet downcomer assemblies are each represented by a volume that is not intersected by the sieve tray plane. The inlet and outlet downcomer assemblies sit atop the sieve tray upper surface and are not coplanar with the sieve tray. The design of the inlet and outlet downcomer assemblies allows the sieve tray assembly to be supported on all sides by a support ring. This modular design simplifies tray installation, repair, and replacement.

Because the inlet and outlet downcomer assemblies are modular, leaky or damaged downcomer assemblies can be removed, repaired, and/or replaced without compromising the sieve deck. A damaged downcomer assembly can be removed and replaced with a new, undamaged or repaired assembly with relative ease. A leaky downcomer assembly can be welded and sealed without heating the vessel wall.

One or both of the modular, non-integral downcomer assemblies can be positioned atop risers, thereby elevating the downcomer assemblies above the sieve deck upper surface. The sieve deck upper surfaces below raised inlet and outlet downcomer assemblies can be perforated, thereby increasing sieve deck active area and treating capacity. This surface-increasing feature has a positive effect on column-treating efficiency and overall plant economics.

DETAILED DESCRIPTION

Various features and advantageous details are explained more fully with reference to the non-limiting embodiments that are illustrated in the accompanying drawings and detailed in the following description. It should be understood, however, that the detailed description and the specific examples, while indicating embodiments of the invention, are given by way of illustration only, and not by way of limitation. Various substitutions, modifications, additions, and/or rearrangements will become apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The sieve tray assemblies, columns, and methods disclosed herein are described with regard to liquid-phase, mass-transfer treating of liquefied petroleum gases (LPG). The sieve tray assemblies, columns, and methods are not limited to LPG mass-transfer treatment, however, and can be extended to a variety of petrochemical and refinery processes, including treatment of natural-gas liquids (NGL), naphthas, gasolines, kerosenes, jet fuels, heating oils, natural gas, refinery gas, and synthetic gas in conjunction with conventional pretreatment and post-treatment processes. Additionally, the sieve tray assemblies, columns, and methods may be applied to any liquid-liquid treating processes, including amine extraction, caustic-free sweetening, fixed-bed sweetening, minimum caustic sweetening, and extraction plus sweetening. The sieve tray assemblies, columns, and methods also may be used in the treating and/or manufacture of ionic liquids, and may be used in various industries, in addition to the petrochemical and refinery industries, including, but not limited to, mining extraction, chemical, and pharmaceutical industries. Additionally, the sieve tray assemblies, columns, and methods disclosed herein may be used in heat transfer and other systems, and thus are not limited to mass-transfer applications.

The term "LPG" refers to Liquified Petroleum Gas, which, in its broadest context, refers to a group of refinery gases that may include the following compounds alone or in mixture: propane, propylene, butane, butylene, and isobutane. These compounds typically exist in gaseous form under ambient conditions, but are maintained in liquid form when stored under pressure.

Figure 1:
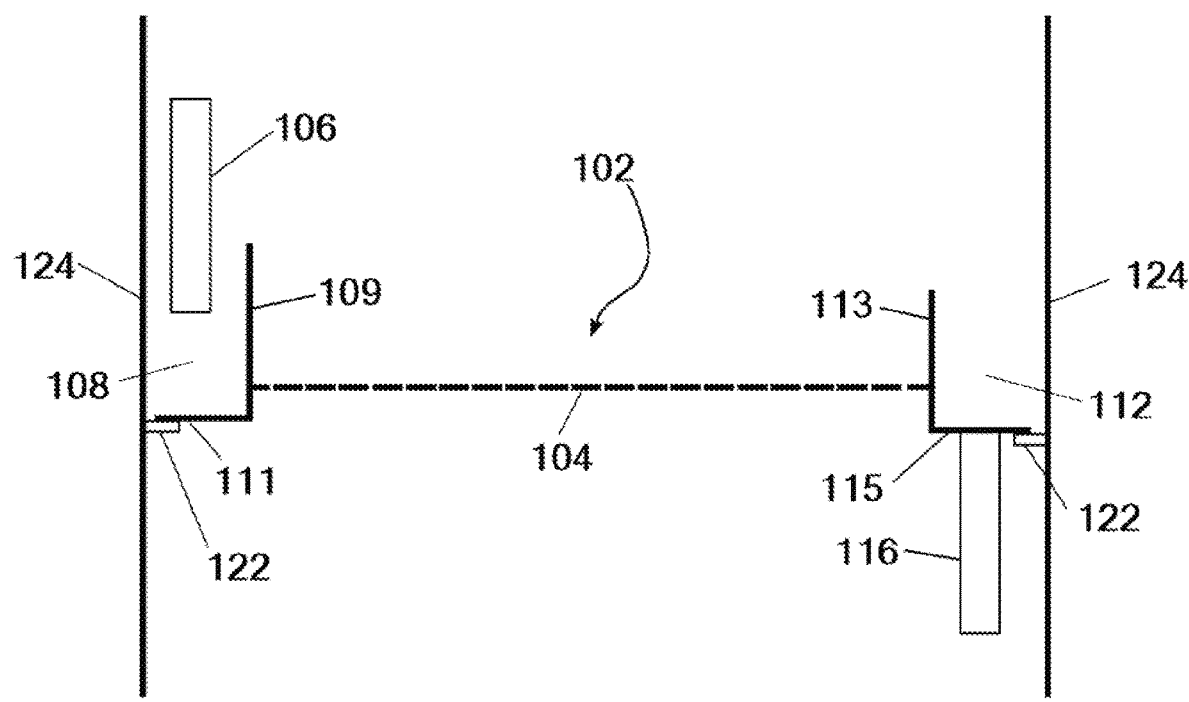
FIG. 1 is an illustration depicting a conventional sieve tray for liquid-liquid contacting.

A conventional, unitary design sieve tray assembly is depicted in FIG. 1. The sieve tray assembly 102 is coupled to a support ring 122 that extends radially inwards from the column wall 124. A perforated sieve deck 104 extends between inlet downcomer assembly 108 and outlet downcomer assembly 112. Inlet downcomer assembly 108 includes inlet downcomer weir 109, inlet downcomer floor 111, and an adjacent portion of column vessel wall 124. The space bordered by inlet downcomer weir, floor, and vessel wall corresponds to an inlet downcomer assembly liquid receptacle volume. Downcomer pipe 106 resides above inlet downcomer assembly 108 and serves as a liquid feed source for inlet downcomer assembly 108. Outlet downcomer assembly 112 includes outlet downcomer weir 113, outlet downcomer floor 115, and column vessel wall 124. Outlet downcomer assembly 112 is coupled to downcomer pipe 116 through a hole in outlet downcomer floor 115. Downcomer pipe 116 serves as a conduit that allows heavy liquid to flow downward from outlet downcomer assembly 112. Downcomer assemblies 108 and 112 design specifications require that the assemblies be leak-free or substantially leak-free.

The conventional, unitary design sieve tray assembly 102 includes perforated sieve deck 104, inlet downcomer assembly 108, outlet downcomer assembly 112, and adjacent portions of column vessel walls 124. Both inlet downcomer assembly 108 and outlet downcomer assembly 112 are coplanar with and coupled to perforated sieve deck 104. That is, the inlet and outlet downcomer assemblies each represent a volume that is intersected by the sieve tray plane. Inlet downcomer assembly 108 and outlet downcomer assembly 112 are either welded directly to the column wall 124 or welded to support ring 122. Inlet downcomer assembly 108 and outlet downcomer assembly 112 each include an adjacent portion of the respective column vessel wall 124. This type of unitary design makes it difficult to repair leaks. Repairs to sieve tray assemblies to fix leaks usually require welding and/or the use of a cutting torch to reaffix to the column shell. Conventional, unitary design sieve tray assemblies are difficult to repair because column wall 124 in an integral part of the unitary design. Design specifications advise against heating the column wall because heating can cause metallurgical damage to the column wall if not performed properly.

In some operational embodiments of sieve tray assembly 102, a heavy liquid flows through downcomer pipe 106 and into inlet downcomer assembly 108. After the inlet downcomer assembly fills with heavy liquid, the excess heavy liquid over-flows inlet downcomer weir 109 and onto perforated sieve deck 104. Accumulation of heavy liquid on top of the sieve deck 104 is controlled by overflow of heavy liquid over the outlet downcomer weir 113 and into the outlet downcomer assembly 112. Sieve deck perforation diameters and hole pitch (distance between holes) are selected to optimize contact performance and minimize leakage of heavy liquid through the perforations. As the heavy liquid level atop perforated sieve deck 104 rises, it flows over outlet downcomer weir 113 and into outlet downcomer assembly 112. The heavy liquid drains out of outlet downcomer assembly 112 through downcomer pipe 116.

During operation of the sieve tray assembly 102, a contaminant-containing light liquid flows up and counter-current to the heavy liquid. Light liquid enters below the lowest sieve deck 104 and accumulates to form a pool. Based on the hydraulic balance, the light liquid is forced through the perforated orifices and into the heavy liquid accumulation on the upper surface of the perforated sieve deck 104. The light liquid disperses into the heavy liquid and at least a portion of contaminants in the light liquid are dissolved or reacted and retained within the heavy liquid. The dispersed light liquid continues to pass upward through the heavy liquid and increasingly coalesces or resolves along the upward direction. The upward gradient of coalescing light liquid results in an accumulated pool of coalesced light liquid below the succeeding sieve tray above.

Figure 2:
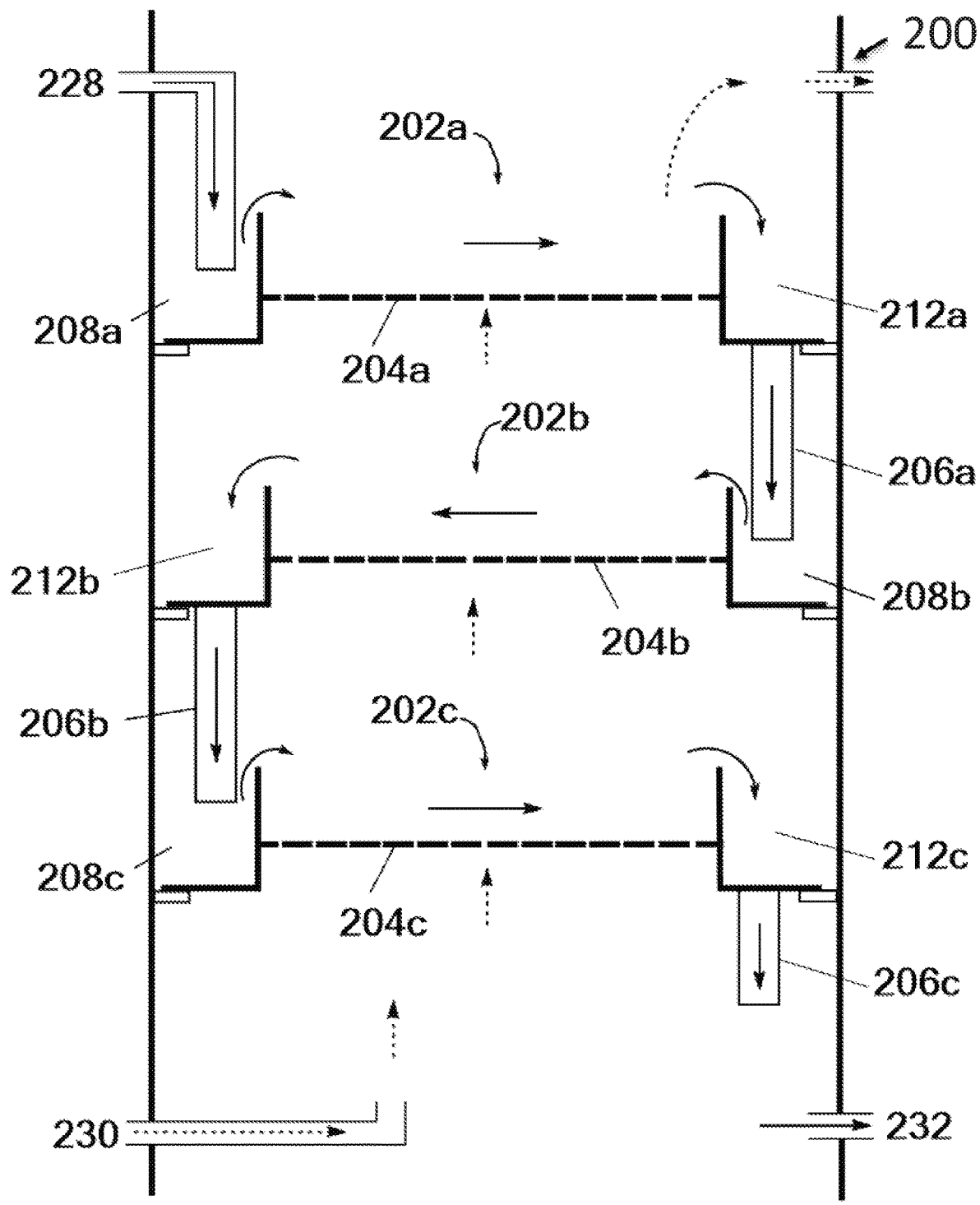
FIG. 2 is a drawing depicting a liquid-liquid contacting column affixed with conventional sieve trays.

Referring now to FIG. 2, a partial view of a liquid-liquid treating column 200 is depicted with three conventional sieve tray assemblies as described above, upper sieve tray assembly 202a positioned near the top of the column, intermediate sieve tray assembly 202b positioned directly below upper sieve tray assembly 202a, and lower sieve tray assembly 202c positioned below intermediate sieve tray assembly 202b near the bottom of the column. While FIG.

2 shows a column having only three tray assemblies, for simplicity's sake, a typical column may include up to 100 or more tray assemblies. The column includes a heavy liquid inlet 228 near the top of the column, and a heavy liquid outlet 232 near the bottom of the column. Heavy liquid outlet 232 may be coupled to a collection reservoir (not depicted for clarity). The column also includes a light liquid inlet 230 near the bottom of the column and a light liquid outlet 234 near the top of the column. Upper sieve tray assembly 202a and lower sieve tray assembly 202c are substantially structurally similar and are rotationally aligned in the same orientation. Intermediate sieve tray assembly 204b is substantially structurally similar to upper and lower sieve tray assemblies; however, it is rotated 180° in relation to upper and lower sieve tray assemblies.

In some operational embodiments, heavy liquid enters heavy liquid inlet 228 and flows into inlet downcomer assembly 208a (solid arrows depict general heavy liquid path). Heavy liquid flows out of upper inlet downcomer assembly 208a and onto upper perforated sieve deck 204a. Heavy liquid flows from left to right across upper perforated sieve deck 204a and into upper outlet downcomer assembly 212a. Heavy liquid drains downward out of upper outlet downcomer assembly 212a through downcomer pipe 206a. Upon exiting downcomer pipe 206a, heavy liquid enters intermediate inlet downcomer assembly 208b. The heavy liquid flows along a path from right to left across intermediate sieve tray assembly 202b, which is rotated 180° with respect to upper sieve tray assembly 202a. Heavy liquid drains into intermediate outlet downcomer assembly 212b, downward through downcomer pipe 206b, and into lower inlet downcomer assembly 208c. Heavy liquid then flows across lower sieve tray assembly 202c from left to right. Lower sieve tray assembly 202c is oriented in the same direction as upper sieve tray assembly 202a, and rotated 180° with respect to intermediate sieve tray assembly 202b. Finally, heavy liquid drains downward through downcomer pipe 206c, and out of column 200 through heavy liquid outlet 232.

While heavy liquid resides on each of the sieve decks, contaminant-containing light liquid enters the column 200 through light liquid inlet 230 (hashed arrows depict general light liquid path). Upon exiting light liquid inlet 230, light liquid travels upward through lower perforated sieve deck 204c where it disperses and contacts the heavy fluid accumulation residing on the upper surface of lower perforated sieve deck 204c.

As light liquid droplets reside within the heavy liquid, mass transfer occur between the two liquids. In some embodiments, the heavy liquid is selected to remove at least some components of the light liquid. In an exemplary embodiment, the light liquid is a mercaptan-contaminated liquefied petroleum gas and the heavy liquid is a decontaminating caustic or amine solution. The caustic or amine solution removes objectionable mercaptan contaminants from the petroleum gas.

The light liquid flows upward through the heavy liquid residing on the upper surface of intermediate sieve deck 204b. As the light liquid travels upward through the heavy liquid, it progressively disengages from the heavy liquid and coalesces. Light liquid accumulates below intermediate perforated sieve deck 204b and repeats the cycle of contact, dispersion, and coalescence until it flows through the upper perforated sieve deck 204a of upper sieve tray assembly 202a. Additional contaminants are removed from the light liquid each time it travels through a heavy liquid layer. After traveling through all of the sieve trays, and heavy liquids residing thereon, the light liquid exits the column through light liquid outlet 234.

Figure 3:
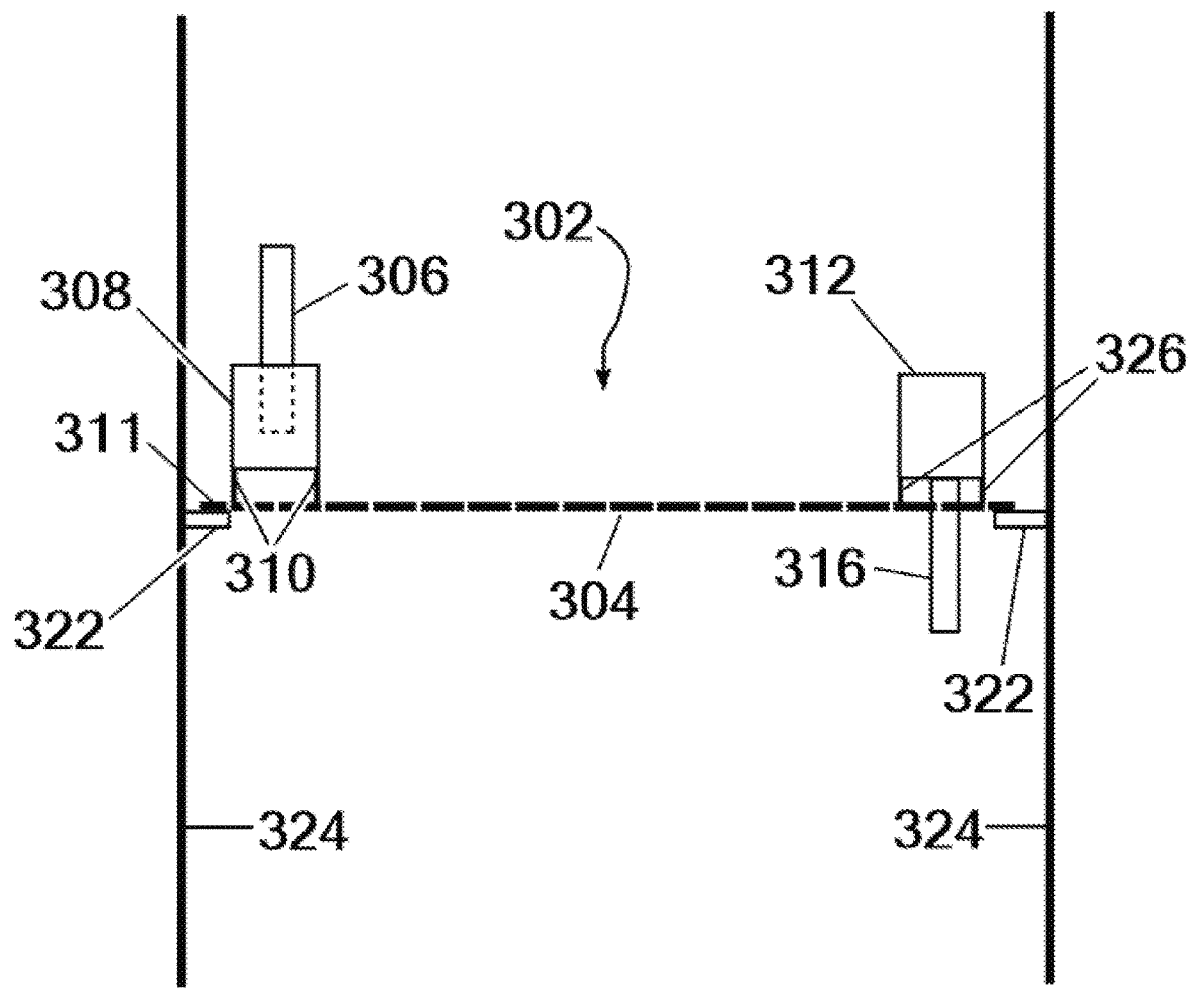
FIG. 3 is a schematic depicting one embodiment of a modular sieve tray assembly according to the present invention. The sieve tray assembly includes inlet and outlet downcomer assemblies that are provided above the sieve deck upper surface.

Referring now to FIG. 3, a modular liquid-liquid sieve tray assembly of the present invention is disclosed. The modular sieve tray assembly 302 comprises a perforated sieve deck 304, a modular inlet downcomer assembly 308 coupled to the upper surface of perforated sieve tray, a modular outlet downcomer assembly 312 coupled to the upper surface of perforated sieve deck 304, and an outlet downcomer pipe 316 that is coupled to the outlet downcomer assembly 312 and extends through perforated sieve deck 304. The inlet and outlet downcomer assemblies are modular components that lie outside the plane of and are positioned atop the perforated sieve deck 304. Because the plane defined by perforated sieve deck 304 does not intersect either the inlet downcomer assembly or the outlet downcomer assembly, the downcomer assemblies are not coplanar with the perforated sieve tray. The horizontal plane defined by sieve deck 304 intersects downcomer pipe 316, however, the sieve deck plane does not intersect outlet downcomer assembly 312. Additionally, the inlet and outlet downcomer assemblies do not include sections of the column wall as part of their structures. By using modular inlet and outlet downcomer assemblies that are distinct, non-unitary components, repair and removal of the downcomer assemblies are facilitated.

The modular outlet downcomer assembly 312 is coupled to outlet downcomer pipe 316. Likewise, a downcomer pipe 306, coupled to the outlet downcomer assembly immediately above, may be positioned above inlet downcomer assembly 308, and may optionally extend downward such that a lower, terminal portion of downcomer pipe 306 resides within inlet downcomer assembly 308. The inlet and outlet downcomer assemblies lie outside the plane defined by sieve deck 304.

The modular design of the downcomer assemblies offers variety for various downcomer embodiments. The inlet and outlet downcomer assemblies are independently detachably separable from the perforated sieve deck 304. One, none, or both of the downcomer assemblies may be coupled to a riser. A riser (310, 326) may reside between perforated sieve deck 304 and inlet coupled to inlet downcomer assembly 308 or outlet downcomer assembly 312. In some embodiments, inlet downcomer assembly 308 and outlet downcomer assembly 312 are each coupled to a riser. The riser functions to support the respective downcomer assembly above perforated sieve deck 304. Raising a downcomer assembly above the perforated sieve deck 304 increases the sieve tray surface area available for perforations, in that any or all of the additional area can be perforated. Additional perforations improve column performance by increasing both column capacity and efficiency. The radially outer portion of each downcomer assembly may be positioned at various lateral locations along the sieve deck. For example, the radially outer portion of the inlet downcomer assembly 308 may abut against column wall 324, or may be positioned at any determined location on perforated sieve deck 304 radially inward from column wall. Any variety of designs are envisioned for inlet and outlet downcomer shapes, including, but not limited to chord-shaped, c-shaped, rounded (circular or ovalic), modified arc-shaped (mod-arc), square, or rectangular. The inlet and outlet downcomer assemblies may have the same shape, or different shapes.

The perforated sieve deck 304 is coupled indirectly to column wall 324 with the use of support ring 322 along a lower tray surface circumferential edge. Alternatively, a support ring may be excluded and the perforated sieve deck 304 may be coupled directly to column wall 324. In some aspects, support ring 322 is coupled to a non-perforated section 311 along the circumferential edge of the sieve deck that is used to provide support. In common applications, perforated sieve decks are welded or otherwise securely attached to the support ring. The perforated sieve deck 304 and support ring 322 are designed to have a minimum overlap for support. The overlap between the sieve deck and support ring serves to accommodate operational mechanical loads and to provide a liquid-tight seal around the circumferential edge of the sieve deck 304.

Applicable columns can assume a variety of shapes and diameters. The invention is not limited to any shape, height, or diameter. In preferred embodiments, the column is round, has a height ranging from 3 to 40 feet, and has a diameter ranging from 10 to 24 inches. In some embodiments, the support ring has a diameter ranging from about 0.5 inch to about 4 inches less than a column shell inner diameter.

Figure 5:
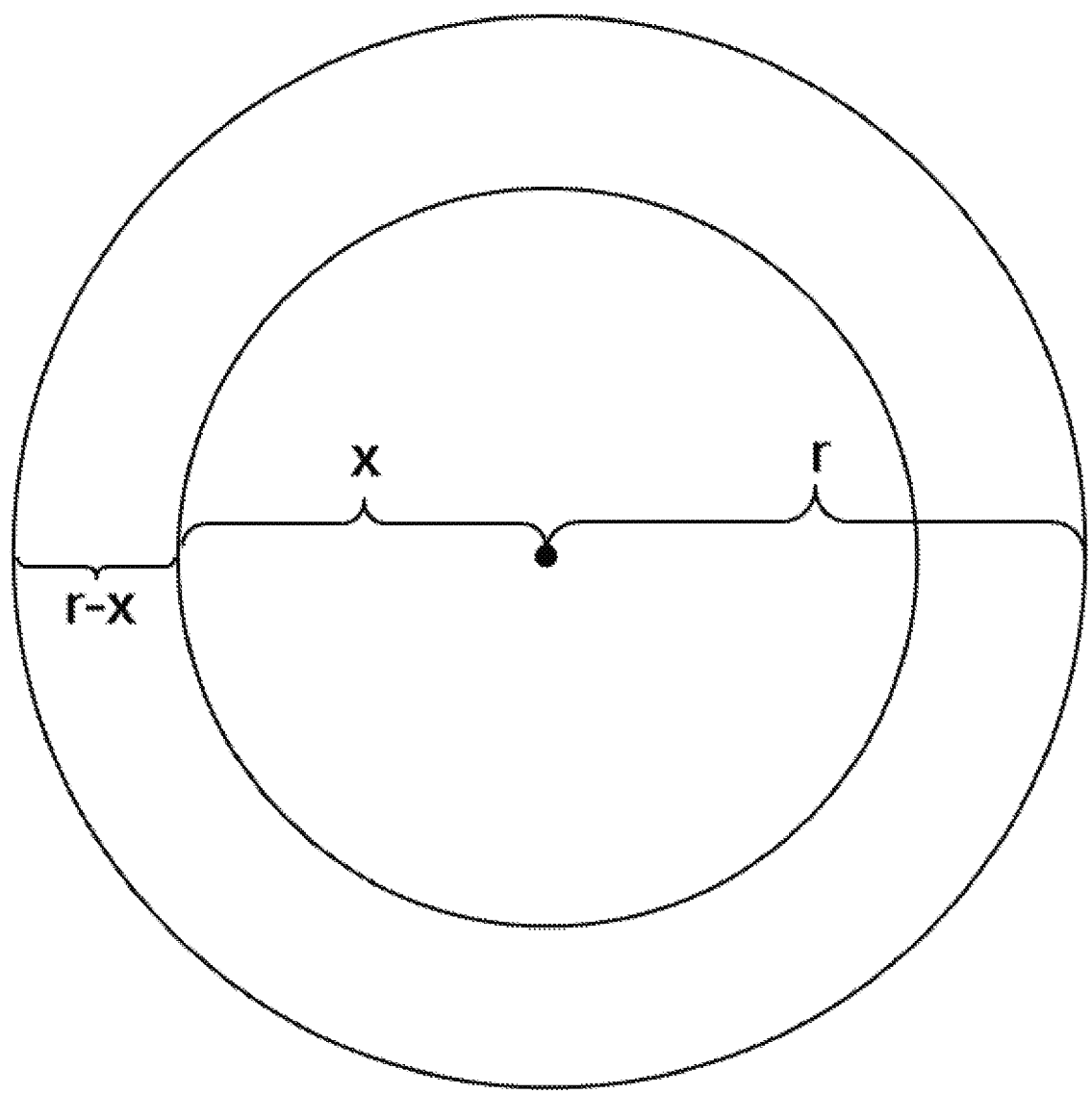
FIG. 5 is a graphic depicting concentric sieve deck perforated and non-perforated areas.

Any perforation design can be envisioned within the scope of the invention. Perforations can be provided in uniform or non-uniform density. In a preferred design, the area of the sieve deck radially adjacent to the column wall or support ring does not have perforations. For example, in some embodiments, the sieve deck comprises a circular perforated section in a circular-swept area ranging from tray center to radius x, where x ranges from about 9 inches to about 23.75 inches, and a non-perforated, disc-shaped section in a circular-swept area ranging from radius r to a radial length r-x. In some aspects, the disc-shaped radial length section r-x ranges from about 0.25 inch to about 6 inches. See FIG. 5 for depiction of circular perforated section and disc-shaped non-perforated section. The sieve deck perforations have a radius ranging from 1.5 mm to 16 mm. The sieve deck perforations have a hole area ranging from 1% to 25% of sieve deck surface area. Any variety of designs are envisioned for the shape of perforations, including but not limited to round, square-parallel, square-diagonal, hexagonal, square-ended slots, and round-ended slot-shaped.

In some operational embodiments, a heavy liquid flows downward through downcomer pipe 306 and into inlet downcomer assembly 308. As inlet downcomer assembly 308 fills with heavy liquid, additional heavy liquid flows out of inlet downcomer assembly 308 and onto perforated sieve deck 304. Excess heavy liquid atop perforated sieve deck 304 flows into outlet downcomer 312. The heavy liquid drains out of outlet downcomer assembly 312 through downcomer pipe 316 to the tray below.

In embodiments that include optional riser 310, any portion of the sieve deck 304 surface area directly below inlet downcomer assembly 308 may be perforated. In embodiments that include one or both risers, some, none, or all of the sieve deck 304 surface area directly below inlet or outlet downcomer assembly may be perforated.

Components of inlet downcomer assembly 308 may be designed to release liquid onto the sieve tray 304 in a manner that maximizes overall performance. Components of outlet downcomer assembly 312 may be designed to receive liquid from the sieve deck 304 in a manner that maximizes overall performance. For example, discrete portions of inlet downcomer weir or outlet downcomer weir may be raised or lowered to tailor heavy liquid residence time and volume on the sieve tray surface.

Light liquid rises from below modular sieve tray assembly 302 and through perforated sieve deck 304 perforations. The light liquid contacts the heavy liquid residing upon perforated sieve deck 304, at which point a processing activity (e.g., mass transfer and/or heat transfer) occurs. In some aspects, contaminants present in the light liquid are contacted and either dissolved or reacted and retained within the heavy liquid and, thus, the rising light liquid includes fewer contaminants after having contacted the heavy liquid. In some embodiments, the heavy liquid includes unwanted contaminants, and the contaminants are removed by the light liquid.

Figure 4:
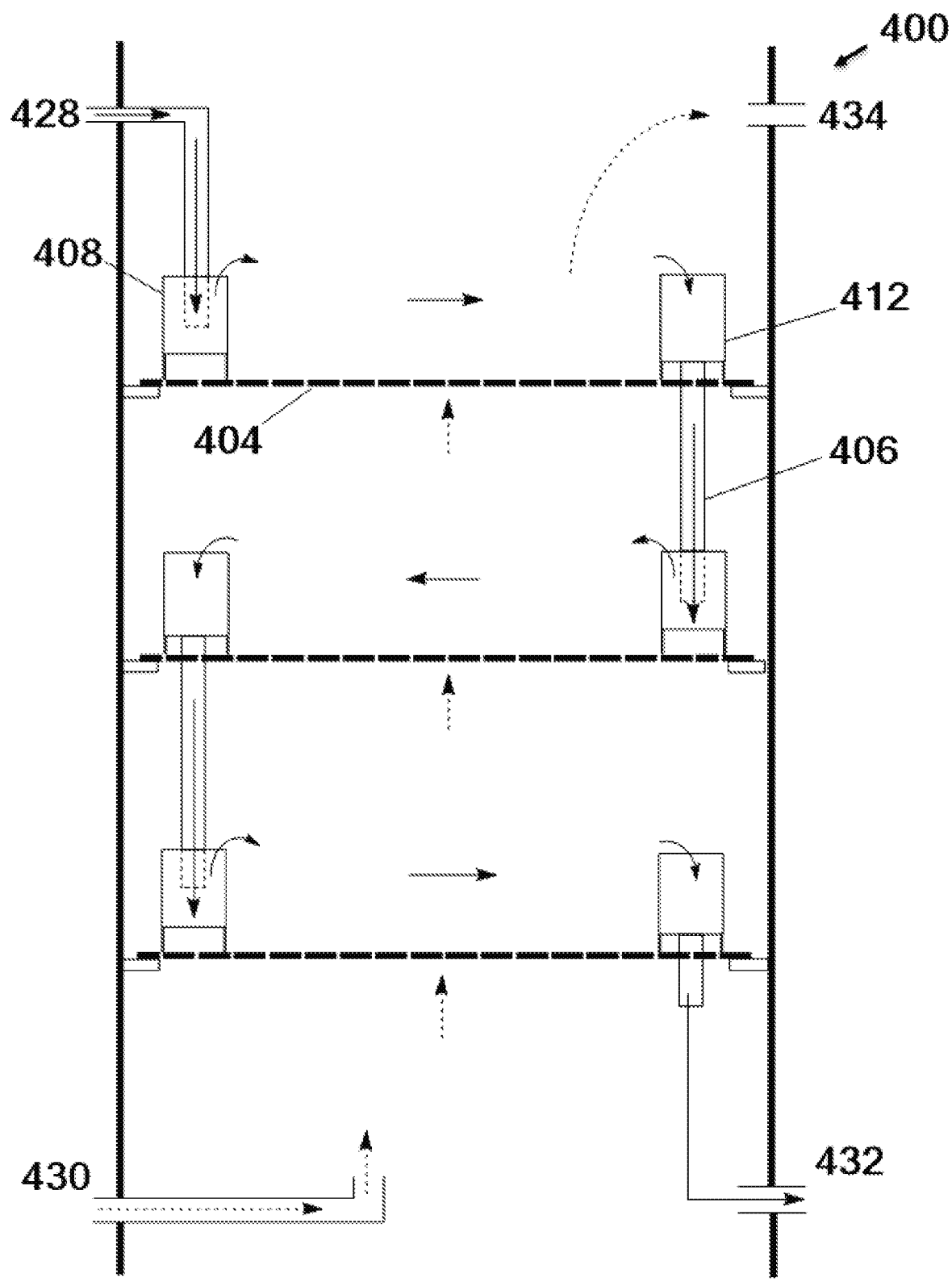
FIG. 4 is a diagram depicting a liquid-liquid treating column that includes a plurality of sieve tray assemblies having increased tray perforation surface area and increased contacting area.

FIG. 4 is a partial view of a liquid-liquid contacting column 400 comprising a plurality of modular liquid-liquid sieve tray assemblies. Each modular sieve tray assembly comprises a sieve deck 404 comprising a plurality of perforations, a modular inlet downcomer assembly 408 coupled to the perforated sieve deck 404 upper surface, a modular outlet downcomer assembly 412 coupled to the perforated sieve deck 404 upper surface, and an outlet downcomer pipe 406 coupled to the outlet downcomer assembly 412. The column includes an integer number of sieve tray assemblies ranging from 2 to 100. In some aspects, each sieve tray assembly is rotated 180° in relation to a sieve tray assembly directly above or directly below it. In embodiments, each outlet downcomer assembly is situated above the inlet downcomer assembly of the sieve tray assembly directly below it. This arrangement enables a heavy liquid to flow from an outlet downcomer pipe to the inlet downcomer assembly of the sieve tray directly below it.

In some aspects, the liquid-liquid contacting column 400 comprises each of a heavy liquid inlet 428, heavy liquid outlet 432, light liquid inlet 430, and a light liquid outlet 434. Heavy liquid outlet 432 may be coupled to a collection reservoir (not depicted for clarity). In some embodiments, the heavy liquid inlet is fluidly coupled to the upper-most sieve tray assembly. In some aspects, the lower-most sieve tray assembly outlet downcomer pipe is coupled to the heavy liquid outlet.

In a contaminant-removal operation, a heavy liquid enters liquid-liquid contacting column 400 through heavy liquid inlet 428 (solid arrows depict general heavy liquid path). The heavy liquid flows into and fills inlet downcomer assembly 408, then flows out of inlet downcomer assembly 408 onto perforated sieve deck 404. The heavy liquid flows across perforated sieve deck 404 and occupies a space defined by the column walls on the outer edges, and by perforated sieve deck 404 below. The heavy liquid level rises until it reaches the lowest point of outlet downcomer assembly weir. The heavy liquid flows into outlet downcomer assembly 412, downward through downcomer pipe 406, and into an inlet downcomer assembly below. This process repeats across each modular liquid-liquid sieve tray assembly until the heavy liquid exits the bottom-most downcomer pipe. The heavy liquid then exits the column through heavy liquid outlet 432.

With respect to the light liquid, which, as noted, which enters column 400 through light liquid inlet 430, this light liquid rises upwards and traverses each modular sieve tray assembly (hashed arrows depict general light liquid path). The rising light liquid travels through perforated sieve deck 404 perforations and into heavy liquid residing upon perforated sieve deck 404. A mass-transfer and/or heat transfer processing activity occurs between the light and heavy liquids. In the depicted mass-transfer embodiment, contaminants present in the light liquid are dissolved by or reacted with the heavy liquid and retained within the heavy liquid. The lower-density light liquid separates from the higher-density heavy liquid and continues upward through each modular sieve tray assembly. The heavy liquid residing upon each upwardly-successive sieve tray assembly removes additional contaminants from the rising light liquid. After the light liquid separates from the heavy liquid residing upon the uppermost sieve tray assembly, the purified light liquid exits through light liquid outlet 434. The contaminant-rich heavy liquid exits the bottom of column 400 through heavy liquid outlet 432. Contaminants may be removed from the contaminant-rich heavy liquid to regenerate a clean heavy liquid.

Some aspects of the disclosure are directed to a liquid-liquid treating method for removing a contaminant from a hydrocarbon liquid. In some embodiments, the method comprises supplying the hydrocarbon liquid to the light liquid inlet of a liquid-liquid contacting column, supplying a contaminant-removing countercurrent liquid to a column heavy liquid inlet, and collecting a purified hydrocarbon liquid from a light liquid outlet. In some embodiments, the sieve tray assemblies disclosed herein may be used in heat transfer operations in which heat is exchanged between a higher-temperature liquid and a lower-temperature liquid.

Some treating processes may include a catalyst. The catalyst may be dispersed within a solution or may be pre-impregnated on a fixed bed within a liquid-liquid treating column. In some embodiments, the catalyst is employed to convert mercaptans to the corresponding di-sulfide compounds. A catalyst-inclusive process may further include an activator at least one of the heavy and light liquids.

The terms "a" and "an" are defined as one or more unless this disclosure explicitly requires otherwise. The term "substantially" is defined as being largely but not necessarily wholly what is specified (and include wholly what is specified) as understood by one of ordinary skill in the art. In any disclosed embodiment, the term "substantially" may be substituted with "within [a percentage] of" what is specified, where the percentage includes 0.1, 1, 5, and 10 percent. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a column that "comprises," "has," "includes" or "contains" one or more elements possesses those one or more elements, but is not limited to possessing only those one or more elements. Likewise, an element of a system or composition that "comprises," "has," "includes" or "contains" one or more features possesses those one or more features, but is not limited to possessing only those one or more features.

The feature or features of one embodiment may be applied to other embodiments, even though not described or illustrated, unless expressly prohibited by this disclosure or the nature of the embodiments. Any embodiment of any of the disclosed composition, system, or process can consist of or consist essentially of, rather than comprise/include/contain/have, any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb. Details associated with the embodiments described above and others are presented below.

The claims are not to be interpreted as including means-plus- or step-plus-function limitations, unless such a limitation is explicitly recited in a given claim using the phrase(s) "means for" or "step for," respectively.

The invention claimed is:

1. A liquid-liquid contacting column, comprising a plurality of sieve tray assemblies, wherein each sieve tray assembly comprises:
    a sieve deck comprising a plurality of perforations;
    an inlet downcomer assembly coupled to an upper surface of the perforated sieve deck;
    an outlet downcomer assembly coupled to the upper surface of the perforated sieve deck; and
    an outlet downcomer pipe coupled to the outlet downcomer assembly;
    wherein radially outer portions of the inlet and outlet downcomer assemblies are provided radially inward of a sieve deck circumferential edge; and
    wherein the inlet and outlet downcomer assemblies lie outside the plane of the sieve deck and are positioned above the sieve deck.

2. The column of claim 1, wherein the column comprises an integer number of sieve tray assemblies, wherein the integer number ranges from 2 to 100.

3. The column of claim 1, wherein the sieve tray assemblies alternate in alignment such that each sieve tray assembly is rotated 180° with respect to a sieve tray assembly immediately above it.

4. The column of claim 1, wherein the upper-most inlet downcomer assembly is coupled to a heavy liquid source.

5. The column of claim 1, wherein each sieve tray assembly outlet downcomer pipe is situated above the inlet downcomer assembly of the sieve tray directly below it.

6. The column of claim 1, wherein the lower-most sieve tray assembly outlet downcomer pipe is coupled to a heavy liquid outlet.

7. The column of claim 1, wherein at least one of the inlet downcomer assembly and outlet downcomer assembly comprises a riser to support the respective downcomer assembly above a sieve deck upper surface.

8. The sieve tray assembly of claim 1, wherein the sieve deck surface area situated below either or both of the riser-equipped downcomer assemblies comprises a plurality of perforations.

9. The sieve tray assembly of claim 1, further comprising a plurality of support rings wherein each support ring couples a sieve deck to the column inner wall, and wherein each support ring is coupled to each sieve deck along a lower sieve deck circumferential edge.

10. The column of claim 1, wherein an outer edge of the inlet downcomer assembly abuts the column wall or is positioned radially inward of the column wall.

11. The column of claim 1, wherein an outer edge of the outlet downcomer assembly abuts the column wall or is positioned radially inward of the column wall.

12. The column of claim 1, wherein a shape of the inlet downcomer assembly or outlet downcomer assembly is each independently selected from the group consisting of chord-shaped, c-shaped, rounded (circular or ovalic), modified arc-shaped (mod-arc), square, or rectangular.

\* \* \* \* \*